(12) United States Patent
Liu et al.

(10) Patent No.: US 6,524,137 B1
(45) Date of Patent: Feb. 25, 2003

(54) INTEGRAL MULTIPLEX ADAPTER CARD

(75) Inventors: Wen-Tsung Liu, Hsin Tien (TW);
Chia-Li Chen, Hsin Tien (TW);
Mi-Chang Chen, Hsin Tien (TW)

(73) Assignee: Carry Computer Eng. Co., Ltd., Hsin Tien (TW)

( * ) Notice: Subject to any disclaimer, the term of this patent is extended or adjusted under 35 U.S.C. 154(b) by 0 days.

(21) Appl. No.: 10/097,742

(22) Filed: Mar. 15, 2002

(51) Int. Cl.[7] .............................................. H01R 25/00
(52) U.S. Cl. ........................ 439/638; 439/76.1; 439/945
(58) Field of Search ................... 439/638, 76.1, 439/945, 946

(56) References Cited

U.S. PATENT DOCUMENTS

| | | | | |
|---|---|---|---|---|
| 6,109,931 A | * | 8/2000 | Yotsutani | 439/76.1 |
| 6,122,175 A | * | 9/2000 | Shieh | 361/737 |
| 6,203,378 B1 | * | 3/2001 | Shobara et al. | 439/638 |
| 6,257,902 B1 | * | 7/2001 | Shieh | 439/76.1 |
| 6,264,506 B1 | * | 7/2001 | Yasufuku et al. | 439/638 |
| 6,390,855 B1 | * | 5/2002 | Chang | 439/638 |

\* cited by examiner

*Primary Examiner*—Tho D. Ta
*Assistant Examiner*—Truc Nguyen
(74) *Attorney, Agent, or Firm*—Bacon & Thomas, PLLC

(57) ABSTRACT

An integral multiplex adapter card, it is provided in a housing meeting the size specification of a CF card with an electric circuit board assembly, the housing has thereon a receiving cassette. The electric circuit board assembly is provided on a single base plate thereof with a CF connecting end, a USB connecting end, a common chip set and a set of contact pins. In this way, a small silicon disk including an MS card, SD card or MMC card etc. can be inserted into the receiving cassette of the housing to output data on the silicon disks through the CF connecting end or the USB connecting end. Therefore, silicon disks of different specifications can be used for various digital products each with a CF card interface or a USB interface; these silicon disks thus can have commonness in use. Thereby, this can increase convenience of use of the digital products with a CF card interface or a USB interface each.

5 Claims, 4 Drawing Sheets

INTEGRAL MULTIPLEX ADAPTER CARD

BACKGROUND OF THE INVENTION

1. Field of the Invention

The present invention is related to an integral multiplex adapter card, and especially to an adapter card meeting the size specification of a CF card, the adapter card can allow insertion therein of a small silicon disk such as an MS card, an SD card or an MMC card etc., and has a CF connecting end and a USB connecting end, so that data in the silicon disk of such a size specification can be converted to meet the specification of a CF card or a USB interface.

2. Description of the Prior Art

In the recent years, silicon disks are widely used in the field of information appliance (IA) by virtue of the excellent characteristics that they are light, small, thin and short, having high storage capacity, vibration durability as well as repeated memorizing for multiple times, they can be used for multiple digitalized products popularized in the markets such as a personal digital assistance (PDA), a digital camera (DSC), a digital walkman (MP3 Player) etc., the products almost all use silicon disks as storage media.

Nowadays, silicon disks in the whole globe do not have a unified specification, and related products include at least: PCMMCIA cards, CF cards (CompactFlash Cards), SM cards (Smart Media Cards), MMC cards (MultiMedia Cards), MS cards (Memory Stick Cards) and SD cards (Secure Digital Cards) etc., they are multitudinous and respectively prevailing in the markets.

However, lacking of a unified specification of the silicon disks is not good in fact to the consumer masses; this is because the silicon disks can not have effective communication among the portable digital products, computer systems and peripheral equipment of computers, this results inconvenience of consumers in using them, the consumers thereby will be quite limited in choosing digital products in the future. It is, therefore, an extremely important direction of thought to increase convenience of consumers in using silicon disks of different specifications.

In order to get commonness among the silicon disks of different specifications, designing shall aim at those silicon disks with larger applicability, so that other silicon disks can be applied to the specification of this kind of silicon disk, and such measures can be positively significant. In the silicon disks mentioned above, a CF card is of a memory card specification which is light, small, thin and short, it has the characteristics of good data preservation ability, high reliability and electric power saving ability etc., thereby it is quite often used on consumptive electronic products, and is developed to make a memory card, a data card, a cable or wireless network card, a bluetooth card (wireless communication card) etc.; thereby it has wide practicability, and relatively more digital products adopt CF cards as their specification in application.

The inventor of the present invention decided to adopt the specification of CF cards as a basis of designing, the reason is, in addition to the larger function and practicability of the CF cards, there is an important factor of consideration that the CF cards have moderate size specification. For example, the size specification of the CF cards is as below, 43 mm wide×3.3/5 (Type I/II) mm thick (in the size specification of the CF cards, length is standard 36 m, but it can be extended for other usage, e.g., being used as a connector for pins of telephone wires). While the size specifications of the MS cards, SD cards and MMC cards are individually 21.5 mm wide×2.8 mm thick, 24 mm wide×1.4 mm thick and 24 mm wide×2.1 mm thick, that is, the space formed from the width and thickness of the size specification of the CF cards is adequate to accommodate an MS card, an SD card or an MMC card. In view of this, the inventor of the present invention decided to adopt the specification of CF cards as a basis of designing.

SUMMARY OF THE INVENTION

Particularly, the integral multiplex adapter card of the present invention is provided in a housing meeting the size specification of a CF card with an electric circuit board assembly, the housing has thereon a receiving cassette. The electric circuit board assembly is provided on a single base plate thereof with a CF connecting end, a USB connecting end, a common chip set and a set of contact pins. In this way, a small silicon disk including an MS card, SD card or MMC card etc. can be inserted into the receiving cassette of the housing to output data on the silicon disks through the CF connecting end or the USB connecting end.

The primary object of the present invention is to adopt the above stated designing to make the small silicon disks including MS cards, SD cards or MMC cards etc. available for various digital products each with a CF card interface or a USB interface, so that these silicon disks of different specifications can have commonness in use. Digital products only with a CF card interface or a USB interface each can thereby take a silicon disk with the specification of the MS cards, SD cards or MMC cards etc. as its storing medium. This can increase convenience of use.

The electric circuit board assembly among the elements of the present invention is also a large break through of the present invention, as to this:

Among the related prior arts, a "card reading machine" has a function to read silicon disks, and to transmit data by connecting of a USB interface (when a USB interface is provided) with the main frame of a computer. The conventional "card reading machine" is in the form of a cassette having a base plate with a connecter, and an electric circuit board (PCB) with a chip set and a transmission interface. The base plate has to be electrically connected with the electric circuit board; when a silicon disk is inserted into the card reading machine, it connects the pins of the connecter which transmit signals through the base plate and then to the electric circuit board, and the signals are output by means of the chip set and the transmission interface.

The conventional "card reading machine" is externally connected with the main frame of the computer; its volume can be varied in pursuance of designing of the appearance thereof at will of the manufacturer. Therefore, the interior space thereof is certainly adequate to receive the base plate and the electric circuit board. The contour of the present invention must have the thickness thereof met the size specification of the CF cards (3.3/15 mm); to provide a base plate and a electric circuit board with in such a thickness, there must be no redundant space to further receive a small silicon disk such as an MS card, an SD card or an MMC card etc. Therefore, in designing the present invention, the base plate and the electric circuit board shall be combined with each other, i.e., an electric circuit board assembly shall be adopted instead of the conventional base plate and electric circuit board.

In view of this, the present invention takes the advantage of the space style of a card (referring to the preceding narration, of which the width is 43 mm which is far larger than any of the widths of an MS card, an SD card and an MMC card, namely 21.5 mm, 24 mm and 24 mm respectively) in designing an electric circuit board assembly. In which, a set of contact pins are provided in the range of the width 24 mm of a single base plate, the remaining width of the base plate (about 43−24=19 mm) is used to amount a common chip set; a CF connecting end and a USB connecting end are respectively provided on the front and the rear ends of the base plate. In this way, the present invention gets the electric circuit board assembly by providing the common chip set and the set of contact pins on the base plate, and largely reduces space and thickness, the MS card, SD card or MMC card can be inserted therein within the limited space.

Additionally, it is worth mentioning that providing of a USB interface (common serial port bus) is originally for convenience of connection and communication of various digital products with a computer; and just mount a USB interface respectively on the peripheral equipment and the main frame system of the computer, the object of data transmission via a USB signal transmission line can be achieved.

Thereby, providing of the USB connecting end of the present invention has the purpose, in addition to make the silicon disks including MS cards, SD cards or MMC cards etc. available for various digital products each with a CF card interface, to directly make interconnection between the silicon disks and the main frame of the computer. And this is another object of the present invention to take the silicon disks as storing media.

And more, in practicing the present invention, the receiving cassette can be provided at the lateral side of its insertion groove with a plurality of positioning spring leaves; when an MS card, SD card or MMC card is inserted, it can be positioned by the positioning spring leaves; and after positioning, the front edge of the MS card, SD card or MMC card is exactly flush with the front edge of the housing to avoid collision and to increase stability.

The present invention will be apparent after reading the detailed description of the preferred embodiment thereof in reference to the accompanying drawings.

DETAILED DESCRIPTION OF THE PREFERRED EMBODIMENT

Figure 1:
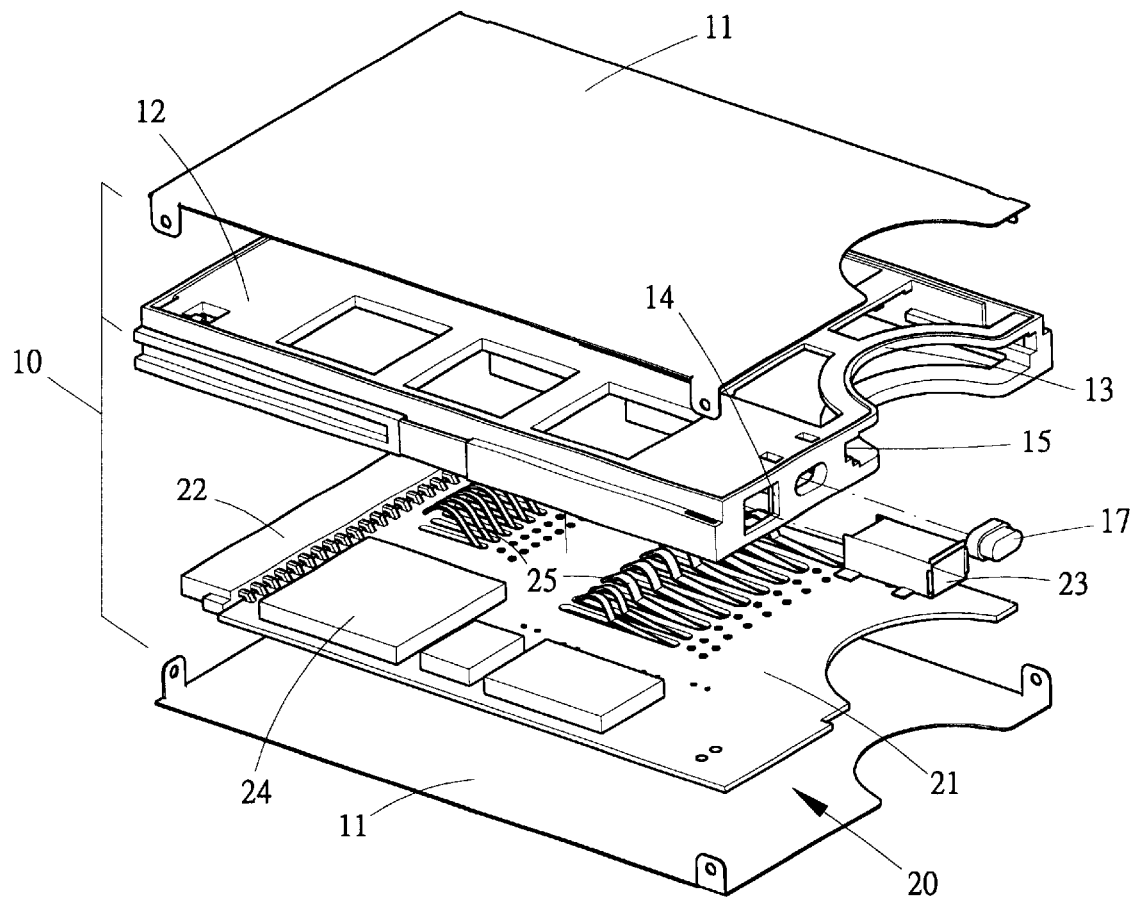
FIG. 1 is an analytic perspective view of the present invention.
Figure 2:
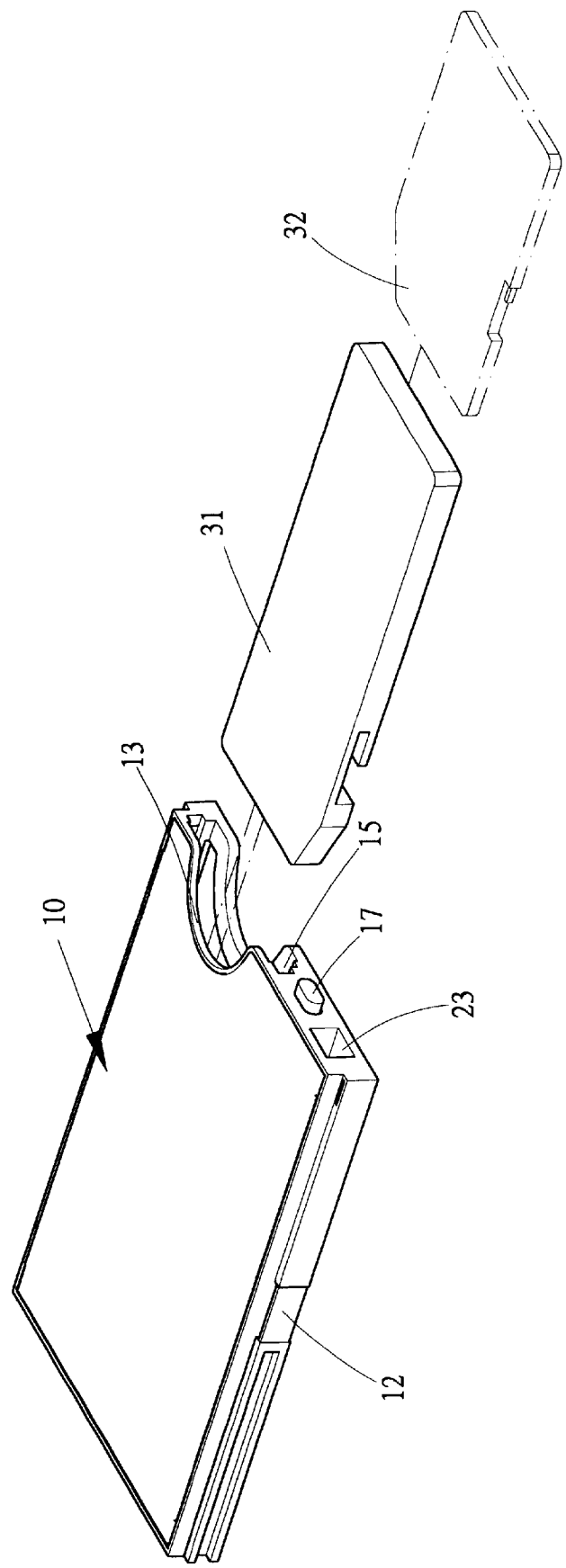
FIG. 2 is a perspective view showing the appearance of the present invention.

Referring to FIGS. 1 and 2, the integral multiplex adapter card of the present invention is provided in a housing 10 meeting the size specification of a CF card with an electric circuit board assembly 20. In this way, a small silicon disk including an MS card 31, SD card 32 or MMC card (with the same appearance as that of the SD card, there is only an SD card shown in the drawings) etc. can be inserted into the slot of a receiving cassette 12 of the housing.

Wherein, the housing 10 is composed of an upper and a lower cover plate 11 as well as the receiving cassette 12 which has on the front edge thereof a recessed arciform slot 13 and a plurality of holes 14. In the slot 13 there is an insertion groove 15 capable of receiving a small silicon disk including an MS card 31, SD card 32 or MMC card. When the two cover plates 11 are closed to cover the receiving cassette 12, the apparent size specification of the housing 10 has a width and a thickness meeting the specification of a CF card.

The abovementioned electric circuit board assembly 20 is provided beneath the receiving cassette 12, wherein, a single base plate 21 is provided thereon with a CF connecting end 22, a USB connecting end 23, a common chip set 24 and a set of contact pins 25.

Figure 3:
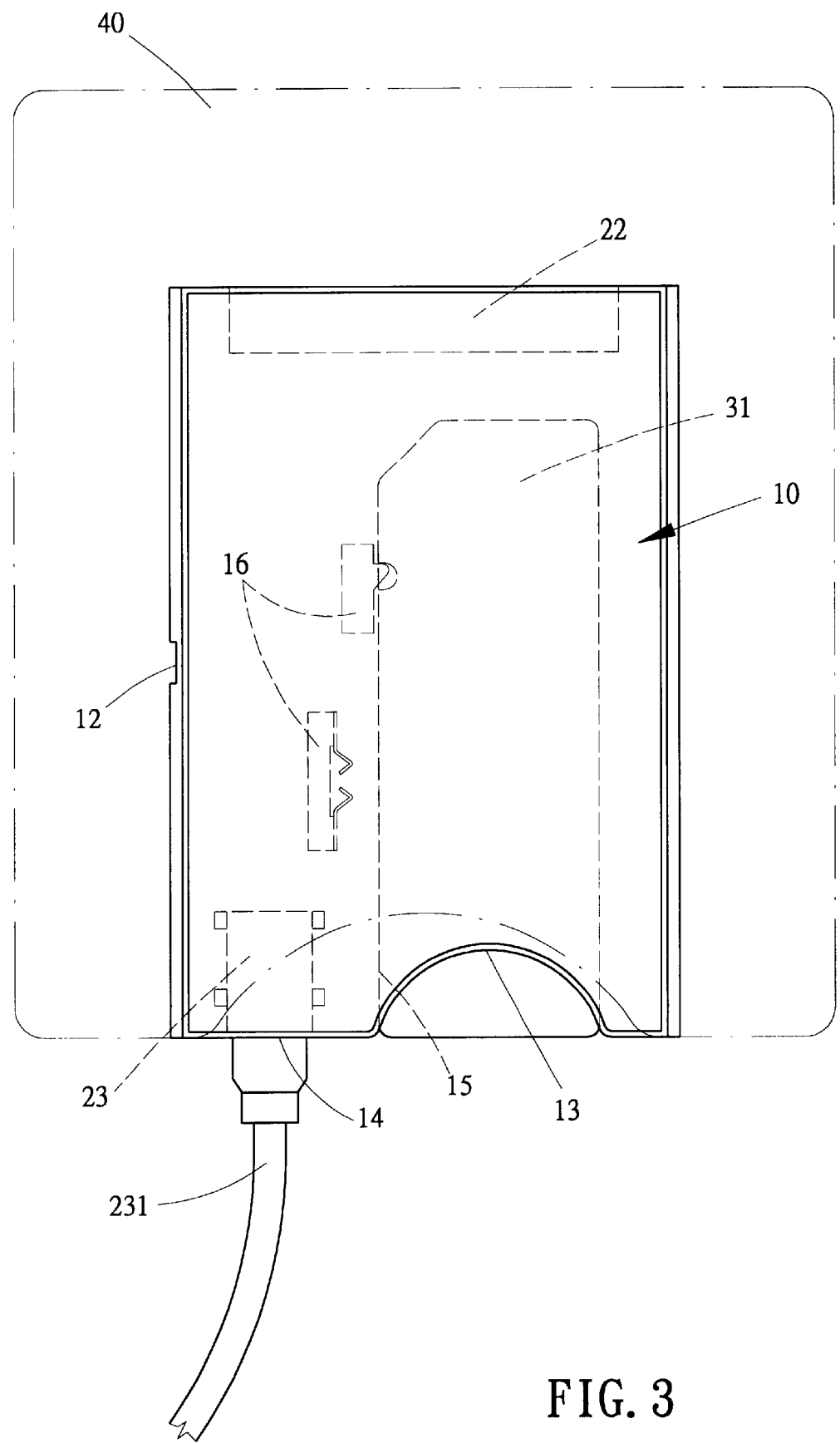
FIG. 3 is a schematic view showing the state of use of the present invention.

Referring together to FIGS. 1 to 4, the CF connecting end 22 is provided on the rear end of the base plate 21 in corresponding in position with the area on the rear of the housing 10. When the housing 10 is inserted in the CF insertion slot of a digital product 40 such as a PDA (as shown in FIG. 3), the CF connecting end 22 can be connected with the CF card interface provided on the digital product 40.

The USB connecting end 23 is provided on the front end of the base plate 21 in corresponding in position with the area of the holes 14 on the receiving cassette 12, the pins of a USB transmission line 231 can be inserted in the holes 14 of the housing 10 to electrically connect with the USB connecting end 23 for transmitting signals.

The set of contact pins 25 is provided on the base plate 21 in corresponding in position with the area under the insertion groove 15; the pins 25 are arranged in a front and a rear line. When an MS card 31 is inserted into the insertion groove 15 from the slot 13, the original pins on the MS card 31 can contact and connect with the pins 25 on the rear line; and when an SD card 32 or MMC card is inserted into the insertion groove 15 from the slot 13 (as shown in FIG. 4), the pins thereon can contact and connect with the pins 25 on the front line.

The common chip set 24 is provided on the base plate 21 in corresponding in position with the area beside the set of contact pins 25. When a silicon disk such as an MS card 31, SD card 32 or MMC card (FIG. 3) is inserted to contact and connect with the pins 25, the common chip set 24 can read the data on the silicon disk, and the data on the silicon disk are output through the CF connecting end 22 or the USB connecting end 23.

Figure 4:
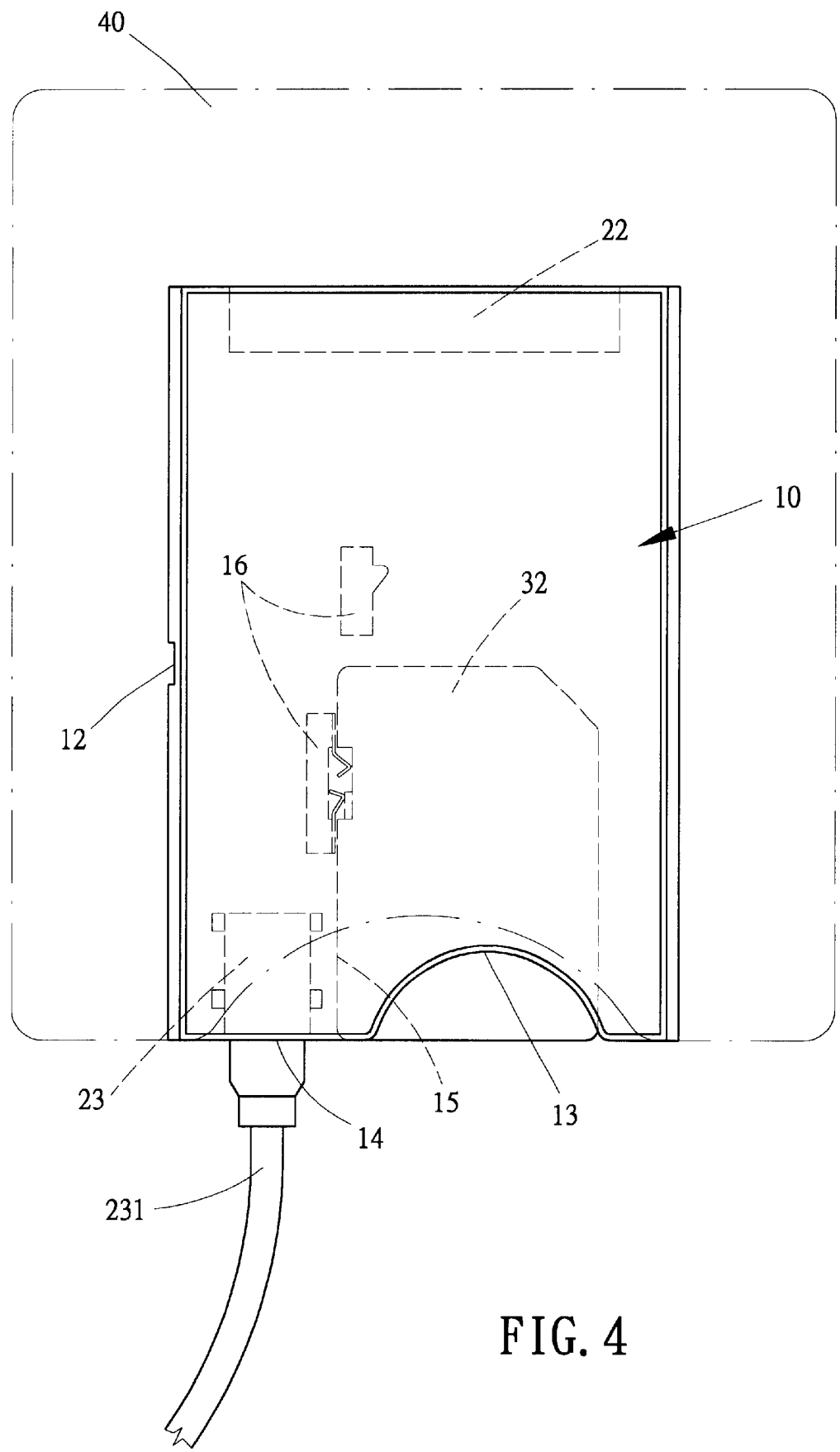
FIG. 4 is another schematic view showing the state of use of the present invention.

As shown in FIGS. 3 and 4, when in practicing the present invention, the insertion groove 15 can be provided at the lateral side thereof with a plurality of positioning spring leaves 16; when an MS card 31 or an SD card 32 is inserted, it can be positioned by the positioning spring leaves 16; and after positioning, the front edge of the MS card 31 or the SD card 32 is exactly flush with the front edge of the housing 10 to avoid collision. Further, the receiving cassette 12 of the housing 10 has on the front edge thereof a recessed arciform slot 13, and the upper and the lower end faces of the front end of the MS card 31 or the SD card 32 are exposed to the outside of the slot 13 to allow a user to draw the MS card 31 or the SD card 32 in the housing 10 outwardly. Moreover, as shown in FIG. 1, the housing 10 is provided on the front end thereof with an indicating light 17 which is exposed to the outside of one of the holes 14 to indicate the state of use.

The names of the members composing the present invention are only for illustrating a preferred embodiment of the present invention, and not for giving any limitation to the scope of the present invention. It will be apparent to those skilled in this art that, all equivalent modifications and changes without departing from the spirit, scope and characteristic of this invention are intended to form part of this invention.

What is claimed is:

1. An integral multiplex adapter card comprising:

a housing composed of an upper and a lower cover plate as well as a receiving cassette and meeting the width and thickness of the size specification of a CF card apparently, said receiving cassette has on the front edge thereof a slot and a plurality of holes, in said slot there is an insertion groove capable of receiving an MS card, an SD card or an MMC card;

an electric circuit board assembly provided beneath said receiving cassette, wherein, a single base plate is provided thereon with a CF connecting end, a USB connecting end, a common chip set and a set of contact pins;

said CF connecting end is provided on the rear end of said base plate in corresponding in position with the area on the rear of said housing, when said housing is inserted in a CF insertion slot of a digital product, said CF connecting end is connected with said insertion slot;

said USB connecting end is provided on the front end of said base plate in corresponding in position with the area of said holes on said receiving cassette, the pins of a USB transmission line are connected electrically with said USB connecting end for transmitting signals;

said set of contact pins is provided on said base plate in corresponding in position with the area under said insertion groove; when an MS card, an SD card or an MMC card is inserted into said insertion groove from said slot, the pins on said card contacts and connects with said set of contact pins;

said common chip set is provided on said base plate in corresponding in position with the area beside said set of contact pins; when said MS card, SD card or MMC card is inserted to contact and connect with said set of contact pins, said common chip set reads the data on said card, and the data on said card are output through said CF connecting end or said USB connecting end.

2. An integral multiplex adapter card as in claim 1, wherein, said insertion groove is provided at the lateral side thereof with a plurality of positioning spring leaves; when an MS card, SD card or MMC card is inserted, it is positioned by said positioning spring leaves; and after positioning, the front edge of said MS card, SD card or MMC card is exactly flush with the front edge of said housing to avoid collision.

3. An integral multiplex adapter card as in claim 1, wherein, said receiving cassette has on the front edge thereof a recessed arciform slot, when an MS card, SD card or MMC card is inserted, the upper and the lower end faces of the front end of said card are exposed to the outside of said slot to allow a user to draw said card outwardly.

4. An integral multiplex adapter card as in claim 1, wherein, said housing is provided on the front end thereof with an indicating light which is exposed to the outside of one of said holes to indicate the state of use.

5. An integral multiplex adapter card comprising:

a housing composed of an upper and a lower cover plate as well as a receiving cassette and meeting the width and thickness of the size specification of a CF card apparently, said receiving cassette has on the front edge thereof a recessed arciform slot and a plurality of holes, in said slot there is an insertion groove capable of receiving an MS card, an SD card or an MMC card; said insertion groove is provided at the lateral side thereof with a plurality of positioning spring leaves; when an MS card, SD card or MMC card is inserted, it is positioned by said positioning spring leaves, the front edge of said MS card, SD card or MMC card is exactly flush with the front edge of said housing, and the upper and the lower end faces of the front end of said card are exposed to the outside of said recessed arciform slot to allow a user to draw said card outwardly;

an electric circuit board assembly provided beneath said receiving cassette, wherein, a single base plate is provided thereon with a CF connecting end, a USB connecting end, a common chip set and a set of contact pins;

said CF connecting end is provided on the rear end of said base plate in corresponding in position with the area on the rear of said housing, when said housing is inserted in a CF insertion slot of a digital product, said CF connecting end is connected with said insertion slot;

said USB connecting end is provided on the front end of said base plate in corresponding in position with the area of said holes on said receiving cassette, the pins of a USB transmission line are connected electrically with said USB connecting end for transmitting signals;

said set of contact pins is provided on said base plate in corresponding in position with the area under said insertion groove; when an MS card, an SD card or an MMC card is inserted into said insertion groove from said slot, the pins on said card contacts and connects with said set of contact pins;

said common chip set is provided on said base plate in corresponding in position with the area beside said set of contact pins; when said MS card, SD card or MMC card is inserted to contact and connect with said set of contact pins, said common chip set reads the data on said card, and the data on said card are output through said CF connecting end or said USB connecting end.

* * * * *